United States Patent
Tada et al.

(10) Patent No.: US 7,342,062 B2
(45) Date of Patent: Mar. 11, 2008

(54) MONOAZO METAL COMPLEX COMPOUND CONTAINING COMPOSITION AND PRODUCTION METHOD THEREOF

(75) Inventors: Akihiro Tada, Osaka (JP); Tohru Tsuruhara, Osaka (JP)

(73) Assignee: Orient Chemical Industries, Ltd, Osaka (JP)

( * ) Notice: Subject to any disclaimer, the term of this patent is extended or adjusted under 35 U.S.C. 154(b) by 436 days.

(21) Appl. No.: 10/706,426

(22) Filed: Nov. 12, 2003

(65) Prior Publication Data

US 2004/0097618 A1 May 20, 2004

Related U.S. Application Data

(62) Division of application No. 09/871,539, filed on May 31, 2001, now abandoned.

(30) Foreign Application Priority Data

| | | |
|---|---|---|
| May 31, 2000 | (JP) | 2000-163222 |
| Apr. 12, 2001 | (JP) | 2001-114208 |

(51) Int. Cl.
*C08K 5/23* (2006.01)
(52) U.S. Cl. ............... 524/190; 524/108; 524/109; 524/199; 524/398; 524/779; 534/887
(58) Field of Classification Search ........... 524/190, 524/108, 109, 199, 398, 779
See application file for complete search history.

(56) References Cited

U.S. PATENT DOCUMENTS 5,843,611 A * 12/1998 Sukata et al. .......... 430/108.23
6,120,958 A * 9/2000 Ookubo et al. ........ 430/108.23
7,053,140 B2 * 5/2006 Koshida et al. ............ 524/190
2006/0030650 A1 * 2/2006 Koshida et al. ............ 524/190

FOREIGN PATENT DOCUMENTS

| EP | 0 769 530 | 4/1997 |
|---|---|---|
| GB | 2 336 852 | 11/1999 |

OTHER PUBLICATIONS

J. Stehlicek, Sep. 18, 1989, Purification of the 1:2-chromium complex of sodium 2-(3-methyl-1-phenyl-5-pyrazolon-4-ylazo)benzoate with aqueous alkaline propylene glycol solutions, 6001 Chemical Abstracts III: 98957a.
Shiseido Co. Ltd., Sep. 12, 2003, XP-002251541, Database WPI Section Ch. Week 198308 Derwent Publications Ltd., London, GB.
Shiseido Co. Ltd., Sep. 12, 2003, XP-002251542, Database WPI Section Ch. Week 198618 Derwent Publications Ltd., London, GB.

* cited by examiner

*Primary Examiner*—Roberto Rabago
(74) *Attorney, Agent, or Firm*—McGlew and Tuttle, P.C.

(57) ABSTRACT

Monoazo metal complex compound containing composition, the incidence of skin sensitization in a skin sensitization potential test based on the maximization method of said composition being not more than 20% and method for producing said composition which comprises a step for removing impurity substances using an alcoholic organic solvent; charge control agent comprising said composition and toner containing said charge control agent; coloring agent containing said composition and colored thermoplastic resin composition containing said coloring agent.

22 Claims, 6 Drawing Sheets

Fig. 1

| PKNO | TIME | AREA | MK | IDNO | CONC | NAME |
|---|---|---|---|---|---|---|
| 1 | 2.55 | 1024 | | | 0.0646 | |
| 2 | 3.115 | 1507 | V | | 0.0951 | |
| 3 | 3.558 | 8045 | V | | 0.5077 | |
| 4 | 4.092 | 3156 | V | | 0.1991 | |
| 5 | 7.5 | 9851 | | | 0.6216 | |
| 6 | 7.795 | 1226 | V | | 0.0774 | |
| 7 | 8.292 | 1985 | V | | 0.1253 | |
| 8 | 10.388 | 1494318 | | | 94.2966 | |
| 9 | 11.23 | 37009 | V | | 2.3354 | |
| 10 | 12.162 | 12936 | V | | 0.8163 | |
| 11 | 15.507 | 13644 | | | 0.861 | |
| TOTAL | | 1584691 | | | 100 | |

| PKNO | TIME | AREA | MK | IDNO | CONC | NAME |
|---|---|---|---|---|---|---|
| 1 | 2.563 | 3011 | | | 0.2691 | |
| 2 | 2.817 | 1041 | V | | 0.093 | |
| 3 | 2.965 | 1497 | V | | 0.1338 | |
| 4 | 3.195 | 1142 | V | | 0.102 | |
| 5 | 3.58 | 21621 | V | | 1.932 | |
| 6 | 4.082 | 22580 | V | | 2.0177 | |
| 7 | 4.38 | 5961 | V | | 0.5326 | |
| 8 | 4.573 | 5642 | V | | 0.5042 | |
| 9 | 4.833 | 2587 | V | | 0.2312 | |
| 10 | 5.082 | 6591 | V | | 0.589 | |
| 11 | 5.362 | 14052 | V | | 1.2557 | |
| 12 | 5.9 | 4674 | V | | 0.4177 | |
| 13 | 6.233 | 4953 | V | | 0.4426 | |
| 14 | 6.567 | 2774 | V | | 0.2479 | |
| 15 | 6.982 | 3420 | V | | 0.3056 | |
| 16 | 7.502 | 7759 | V | | 0.6934 | |
| 17 | 7.795 | 1102 | V | | 0.0985 | |
| 18 | 8.32 | 1680 | V | | 0.1501 | |
| 19 | 10.467 | 926895 | | | 82.8255 | |
| 20 | 11.24 | 35623 | V | | 3.1832 | |
| 21 | 12.132 | 15297 | V | | 1.3669 | |
| 22 | 15.523 | 20884 | | | 1.8661 | |
| 23 | 20.845 | 1567 | | | 0.14 | |
| 24 | 22.327 | 1101 | | | 0.0984 | |
| 25 | 25.863 | 3658 | | | 0.3268 | |
| 26 | 26.887 | 1983 | V | | 0.1772 | |
| TOTAL | | 1119895 | | | 100 | |

Fig. 4

| PKNO | TIME | AREA | MK | IDNO | CONC | NAME |
|---|---|---|---|---|---|---|
| 1 | 3.583 | 474839 | | | 10.969 | |
| 2 | 4.1 | 335776 | V | | 7.7697 | |
| 3 | 4.4 | 95529 | V | | 2.2105 | |
| 4 | 4.633 | 88201 | V | | 2.0409 | |
| 5 | 5.05 | 142809 | V | | 3.3045 | |
| 6 | 5.383 | 219284 | V | | 5.0741 | |
| 7 | 5.917 | 72953 | V | | 1.6881 | |
| 8 | 6.233 | 56989 | V | | 1.3187 | |
| 9 | 6.567 | 68825 | V | | 1.5926 | |
| 10 | 7.1 | 86452 | V | | 2.0004 | |
| 11 | 7.517 | 62899 | V | | 1.4555 | |
| 12 | 7.783 | 73507 | V | | 1.7009 | |
| 13 | 8.367 | 76641 | V | | 1.7734 | |
| 14 | 8.683 | 46454 | V | | 1.0749 | |
| 15 | 8.983 | 89393 | V | | 2.0685 | |
| 16 | 10.467 | 1200982 | V | | 27.7901 | |
| 17 | 11.233 | 293380 | V | | 6.7887 | |
| 18 | 12.3 | 186045 | V | | 4.305 | |
| 19 | 13.433 | 69518 | V | | 1.6086 | |
| 20 | 13.95 | 46458 | V | | 1.075 | |
| 21 | 15.5 | 307176 | SV | | 7.1079 | |
| 22 | 18.65 | 43025 | V | | 0.9956 | |
| 23 | 19.367 | 20816 | V | | 0.4817 | |
| 24 | 20.103 | 20304 | V | | 0.4698 | |
| 25 | 20.833 | 27672 | V | | 0.6403 | |
| 26 | 21.367 | 25397 | V | | 0.5877 | |
| 27 | 22.3 | 19176 | V | | 0.4437 | |
| 28 | 25.883 | 46258 | V | | 1.0704 | |
| 29 | 26.9 | 25666 | V | | 0.5939 | |
| TOTAL | | 4321619 | | | 100 | |

MONOAZO METAL COMPLEX COMPOUND CONTAINING COMPOSITION AND PRODUCTION METHOD THEREOF

This application is a division of U.S. application Ser. No. 09/871,539, filed May 31, 2001, now abandoned, the entire contents of which are hereby incorporated herein by reference.

BACKGROUND OF THE INVENTION

1. Field of the Invention

The present invention relates to a monoazo metal complex compound containing composition exhibiting almost no skin sensitization potential, a production method therefor, a charge control agent comprising the monoazo metal complex compound containing composition, a toner for developing electrostatic images that contains the charge control agent, a coloring agent containing said monoazo metal complex compound containing composition, and a colored thermoplastic composition containing said monoazo metal complex compound containing composition as a coloring agent.

2. Description of the Prior Art

Skin sensitization is a contact allergic reaction induced by skin contact with a simple chemical substance, a metal, or the like, and is a form of skin allergy (e.g., allergic contact dermatitis). The term allergy is defined as an inflammation reaction due to antibody production by the living body. Sensitization refers to the entry of an antigen in the living body to cause an antibody to be produced. In recent years, an emphasis has been placed on the potential of compounds for inducing skin sensitization in view of their safety.

Examples of reported cases wherein the safety of chemical substances posed a problem include a case of a chlorinated phosgene compound produced from a reaction of sodium hypochlorite and a yellow dye in a DC brand sweater [Hifu/Skin 1989;31 (Supple. 7):24-33], a case of the grounder naphthol AS remaining on cloth in a cotton flannel night clothes [Eiseikagaku/Journal of Hygienic Chemistry 1986; 32(5):359-67], a case of the grounder naphthol AS-f) remaining on cloth in a cotton flannel night clothes [Environ. Dermatol. 1995; 2:278-82], a case of Disperse Red 153, Disperse Blue 106, and Disperse Blue 124 in one-piece dress [Contact Dermatitis 1996; 34:6-11], a case of the azo disperse dyes Disperse Yellow 3, Disperse Orange 3, and Disperse Red 17 formulated as coloring agents in plastic eyeglass frames [Environmental Dermatology 1994; 1(Supple. 1), 50], and a case of Solvent Orange 60 formulated as a coloring agent in plastic eyeglass frames [Environmental Dermatology 1998;5(Supple. 1):92]. As the demand for regulation of the skin sensitization potential of compounds is increasing, it is of paramount importance from the viewpoint of safety to assess the allergic reaction of new chemicals and newly launched commercial products.

For determining the sensitizing potential of such chemicals, there have been proposed new methods, including the Beuhler test method, which simulates actual use in the human body, and the maximization method, which determines the potential of the test compound. As a result of the meeting of experts of the Organization for Economic Cooperation and Development/OECD held in May of 1991, the OECD guidelines were presented, in which priority is given to the Beuhler test method and the maximization test of Magnusson and Kligman using the guinea pig (maximization test method).

Monoazo metal complex compounds are used for various applications, occupying an important position in the industry. Major applications include dyes used to impart colors for writing inks, recording inks (including inkjet inks), leather, plastics, etc.; coloring matters based on absorption of ultraviolet light, near infrared light, infrared light, etc.; and charge control or enhancement agents used in toners for developing electrostatic images and resin powder paints for electrostatic painting.

These applications of monoazo metal complex compounds all call for consideration of effects on the human body and the environment, in addition to the performance required for the applications. In the case of monoazo metal complex compounds as charge control agents, for example, their effects on the human body and the environment as compounds, as well as their charge characteristics, must be taken into consideration.

Regarding effects on the human body, skin sensitization potential tests for compounds provide an especially important set of safety data. In recent years, priority has often been given to assessment of skin sensitization potential based on the aforementioned maximization method.

However, because of the production method, monoazo metal complex compounds have impurity substances from starting materials, and byproducts and impurity substances associated with metallization, resulting in problems to be solved in skin sensitization assessed using the maximization method.

Accordingly, the object of the present invention is to provide a monoazo metal complex compound containing composition characterized by high safety to the human body and a low incidence of skin sensitization in skin sensitization tests, especially the maximization method, a production method therefor, a charge control agent comprising the monoazo metal complex compound containing composition, a toner for developing electrostatic images that contains the charge control agent, a coloring agent containing said monoazo metal complex compound containing composition, and a colored thermoplastic composition containing the monoazo metal complex compound containing composition as a coloring agent.

SUMMARY OF THE INVENTION

The monoazo metal complex compound containing composition of the present invention contains a monoazo metal complex compound, the incidence of skin sensitization in a skin sensitization potential test, especially in a skin sensitization potential test based on the maximization method, of said composition being not more than 20%.

This monoazo metal complex compound containing composition is desirably such that the purity of the aforementioned monoazo metal complex compound is not less than 90% as determined by high performance liquid chromatography.

The production method of the present invention for a monoazo metal complex compound containing composition is a method for producing the aforementioned monoazo metal complex compound containing composition and comprises a step for removing impurity substances using an alcoholic organic solvent.

By comprising a step for removing impurity substances using an alcoholic organic solvent to obtain a composition containing a monoazo metal complex compound at high purity, the incidence of skin sensitization in skin sensitization potential tests based on the maximization method can be reduced to not more than 20%.

The charge control agent of the present invention comprises the aforementioned monoazo metal complex compound containing composition, and the toner of the present invention for developing electrostatic images contains this charge control agent.

The coloring agent of the present invention contains the aforementioned monoazo metal complex compound containing composition, and the colored thermoplastic resin composition of the present invention contains the aforementioned monoazo metal complex compound containing composition as a coloring agent.

The monoazo metal complex compound containing composition of the present invention possesses good characteristics of monoazo metal complex compounds and is excellently safe to the human body with the incidence of skin sensitization in skin sensitization potential tests, especially in a skin sensitization potential test based on the maximization method, being not more than 20%. The monoazo metal complex compound containing composition of the present invention can be produced using the production method of the present invention.

The charge control agent of the present invention is excellently safe to the human body with the ratio of guinea pigs with skin sensitization signs found in skin sensitization potential tests, especially in a skin sensitization potential test based on the maximization method, being not more than 20%, possesses a practically satisfactory charge characteristic. In addition, because the charge control agent of the present invention is of high purity with impurity substances removed previously, it is sharp in charge amount distribution, high in charge amount uniformity, excellent in charge rise profile, low in environmental dependency, and when used in toner, it is excellent in durability in multiple repeated use of toner, and does not adversely affect toner fixability and offset quality.

Because the toner of the present invention for developing electrostatic images contains the charge control agent of the present invention, it is excellently safe to the human body, possesses a practically satisfactory charge characteristic, is sharp in charge amount distribution, high in charge amount uniformity, excellent in charge rise profile, low in environmental dependency, excellent in durability in multiple repeated use, and good in fixability and offset quality.

The coloring agent of the present invention is excellently safe to the human body with the ratio of guinea pigs with skin sensitization signs found in skin sensitization potential tests, especially in a skin sensitization potential test based on the maximization method, being not more than 20%, possesses a practically satisfactory coloring characteristic. In addition, because the coloring agent of the present invention is of high purity with impurity substances removed previously, its solubility is very stable, it exhibits almost no transfer, such as bleeding due to impurity substances, its heat resistance and light fastness are excellent, and its fading is slow with almost no hue change during color fading.

Because the colored thermoplastic resin composition of the present invention contains as a coloring agent a monoazo metal complex compound containing composition that is excellently safe to the human body, is of high purity, and is good in dispersibility and/or solubility in thermoplastic resins, it is excellent in uniform colorability, light fastness, and heat resistance, and provides molded products with improved gloss and appearance.

DETAILED DESCRIPTION OF THE INVENTION

The monoazo metal complex compound containing composition (generally referred to as "monoazo metal complex compound") of the present invention is characterized in that the incidence of skin sensitization in skin sensitization potential tests, especially in a skin sensitization potential test based on the maximization method, is not more than 20%.

The monoazo metal complex compound containing composition of the present invention possesses characteristics comparable to those of commercially available conventional monoazo metal complex compounds and can be used equivalently. In addition, it does not significantly affect the human body with a low incidence of skin sensitization in skin sensitization potential tests, especially in a skin sensitization potential test based on the maximization method.

Skin sensitization tests that can be used for the present invention include skin sensitization tests using adjuvants, such as the maximization test, the adjuvant and strip test, Freund's complete adjuvant test, the optimization test, and the split adjuvant test; and skin sensitization tests using no adjuvant, such as the Beuhler test, the Draize test, and the open epicutaneous test. In addition, in the present invention, skin sensitization tests and simplified test methods based on the aforementioned test methods are also applicable. Providing high accuracy of sensitization measurement, the maximization test (maximization method) is particularly preferable.

In addition, in recent years, there has been a trend for the abolishment of in vivo experimental methods in association with the spirit of animal welfare. Accordingly, in vitro methods for skin sensitization potential tests, such as the local lymphonode assay (LLA), have been developed. Although a problem remains to be solved that all in vitro methods are lower than the maximization method in terms of the power of detection, it is expected that advances such as improvement in the power of detection will be achieved, and that in vitro methods will constitute the mainstream of skin sensitization potential tests. As such, skin sensitization tests are also applicable to the present invention.

A skin sensitization test based on the maximization method can typically be performed as described below. To one previously clipped shoulder of a guinea pig, a 1:1 mixture of Freund's complete adjuvant (immunopotentiator) and the test compound is injected intracutaneously for first induction. For second induction, 5% sodium lauryl sulfate (petrolatum base) is applied in an open state to increase the absorption of the test compound 7 days after the intracutaneous injection and is removed after 24 hours. The test compound is then applied in a closed state to the open application site and removed after 48 hours. Two weeks after closed application of the test compound, the test compound is again applied to elicit the skin reaction; after 24 hours, the test compound is removed and the skin reaction status is examined. At least 10 guinea pigs are used for the treatment group and at least 5 for the control group; rating results are expressed as the ratio of guinea pigs with signs of skin sensitization by the test compound.

The production method of the present invention for a monoazo metal complex compound containing composition (generally referred to as "monoazo metal complex compound") can comprise a step for removing impurity substances other than monoazo metal complex compounds using an alcoholic organic solvent, in, for example, the synthesis of a monoazo metal complex compound, or the purification of a monoazo metal complex compound.

Examples of the step for removing impurity substances other than monoazo metal complex compounds using an alcoholic organic solvent include, but are not limited to, the following.

(1) The monoazo metal complex compound containing composition is dispersed in an alcoholic organic solvent; the resulting dispersion is stirred under heating and filtered, after which the cake filtered out is dried under reduced pressure.

(2) After impurity substances are removed from the monoazo metal complex compound containing composition by thermally refluxing an alcoholic organic solvent using the soxhlet extractor, either the monoazo metal complex compound containing composition is dried under reduced pressure or the alcoholic organic solvent in the wet cake is replaced with water, followed by drying with a warm wind.

(3) A monoazo metal compound is synthesized in a non-alcoholic solvent and after the non-alcohol solvent is replaced with an alcoholic organic solvent, impurity substances are removed by filtration etc., followed by drying. For example, a monoazo metal compound is synthesized in an aqueous system and filtered, and the water in the thus-obtained wet cake is replaced with an alcoholic organic solvent, followed by drying with a warm wind.

(4) A monoazo metal compound is synthesized in an alcoholic organic solvent, and impurity substances are removed by filtration etc., followed by drying.

Alcoholic organic solvents that can be used for the production method of the present invention for a monoazo metal complex compound containing composition include, for example, the following monohydric alcohols, polyhydric alcohols (glycols) and derivatives thereof and mixtures of two or more thereof. Specifically, there may be mentioned alcohols such as methanol, ethanol, 1-propanol, 2-propanol, n-butanol, benzyl alcohol, 1-octanol, 2-octanol, and α-methylbenzyl alcohol, or derivatives thereof; and glycols such as ethylene glycol, diethylene glycol, propylene glycol, hexylene glycol, benzyl glycol, ethylene glycol monodibutyl ether, ethylene glycol monophenyl ether (phenyl glycol), diethylene glycol monoethyl ether, diethylene glycol monomethyl ether, diethylene glycol monobutyl ether, diethylene glycol dibutyl ether, diethylene glycol monophenyl ether, propylene glycol monobutyl ether, propylene glycol monophenyl ether, dipropylene glycol monomethyl ether, dipropylene glycol monoethyl ether, dipropylene glycol monobutyl ether, dipropylene glycol monophenyl ether, tripropylene glycol monomethyl ether, tripropylene glycol monoethyl ether, diethylene glycol monoethyl ether acetate, propylene glycol monomethyl ether acetate, and propylene glycol diacetate, or derivatives thereof. Preference is given to one member or a mixture of two or more members selected from the group consisting of methanol, ethanol, 1-propanol, 2-propanol, n-butanol, ethylene glycol, propylene glycol monomethyl ether, and ethylene glycol monoethyl ether.

The monoazo metal complex compound containing composition of the present invention is useful, provided that the monoazo metal complex compound is a compound of the following formula (1):

wherein, each of $R^1$ through $R^4$ and $R^6$ independently (whether identical or not) represents a hydrogen atom, a normal or branched alkyl group having 1 to 18 carbon atoms (e.g., methyl, ethyl, propyl, butyl, pentyl, hexyl, heptyl, octyl, nonyl, undecyl, dodecyl), a normal or branched alkenyl group having 2 to 18 carbon atoms (e.g., vinyl, propenyl, butenyl), a sulfonamide group, a mesyl group, a sulfonic acid group, a hydroxy group, an alkoxy group having 1 to 18 carbon atoms (e.g., methoxy, ethoxy, propoxy, butoxy, pentyloxy, hexyloxy), an acetylamino group, a benzoylamino group, a halogen atom (e.g., Cl, Br, I), or —COO—$R^7$;

$R^7$ represents a normal or branched alkyl group having 1 to 18 carbon atoms (e.g., methyl, ethyl, propyl, butyl, pentyl, hexyl, heptyl, octyl, nonyl, undecyl, dodecyl) or an aryl group having 6 to 18 carbon atoms (e.g., phenyl, tolyl, xylyl, naphthyl);

$R^5$ represents a hydrogen atom, a halogen atom (e.g., Cl, Br, I), a nitro group, a carboxyl group, a normal or branched alkyl group having 1 to 18 carbon atoms (e.g., the same as those mentioned above), an alkenyl group having 2 to 18 carbon atoms (e.g., the same as those mentioned above), an alkoxy group having 1 to 18 carbon atoms (e.g., the same as those mentioned above), an aryl group having 6 to 18 carbon atoms (e.g., the same as those mentioned above), —COO—$R^8$ or $R^8$ represents a normal or branched alkyl group having 1 to 18 carbon atoms (e.g., the same as those mentioned above) or an aryl group having 6 to 18 carbon atoms (e.g., the same as those mentioned above);

Y represents a hydrogen atom, a normal or branched alkyl group having 1 to 8 carbon atoms (e.g., methyl, ethyl, propyl, butyl, pentyl, hexyl, heptyl, octyl), an alkoxy group having 1 to 5 carbon atoms (e.g., methoxy, ethoxy, propoxy, butoxy, pentyloxy), a nitro group, or a halogen atom (e.g., the same as those mentioned above);

m represents an integer from 1 to 3;

M represents a divalent or trivalent metal (e.g., Cr, Fe, Co, Ni, Cu, Ti, Al);

p represents 1 or 2;

$(A)^{q+}$ represents $H^+$, $NH_4^+$, a cation based on an alkali metal (Na, K, or the like), a cation based on an organic amine (aliphatic primary amine, aliphatic secondary amine, aliphatic tertiary amine, or the like), or a quaternary organic ammonium ion;

q represents 1 or 2; and

X represents 1 or 2.

The monoazo metal complex compound in the monoazo metal complex compound containing composition of the present invention is preferably such that $(A)^{q+}$ in Formula (1) above is $H^+$, whereby impurity substances that adversely affect the sensitization potential can be removed efficiently by controlling the alcohol solubility of the monoazo metal complex compound to minimize the loss of the monoazo metal complex compound.

In addition, the monoazo metal complex compound in the monoazo metal complex compound containing composition of the present invention is preferably such that $R^2$ is Cl;

each of $R^1$ and $R^3$ through $R^5$ is a hydrogen atom;

$R^6$ is a hydrogen atom or a normal or branched alkyl group having 1 to 18 carbon atoms;

M is Cr, Fe, or Cu; and $(A)^{q+}$ is $H^+$.

According to the production method of the present invention for a monoazo metal complex compound containing composition, it is possible to produce the monoazo metal complex compound containing composition of the present invention, while remaining starting materials and impurity substances associated with monoazo dyes, byproducts and impurity substances associated with metallization of monoazo dyes, and other undesirable substances are removed efficiently. For example, naphthol AS products such as naphthol AS and naphthol AS-D, which are also used as coupling components of monoazo dyes, described with reference to the prior art above, can be removed so that a monoazo metal complex compound containing composition (generally referred to as "monoazo metal complex compound") with almost no sensitizing potential is obtained.

In addition, the monoazo metal complex compound containing composition of the present invention is effective as a charge control agent. In other words, it serves as a charge control agent such that the incidence of skin sensitization in skin sensitization potential tests, especially in a skin sensitization potential test based on the maximization method, is not more than 20%.

The charge control agent of the present invention possesses charge characteristics comparable to those of commercially available conventional charge control agents comprising monoazo metal complex compounds and can be used equivalently. In addition, it does not significantly affect the human body with a low incidence of skin sensitization in skin sensitization potential tests, especially in a skin sensitization potential test based on the maximization method. Furthermore, because the monoazo metal complex compound as the charge control agent of the present invention is a monoazo metal complex compound of high purity with impurity substances removed previously, it is sharper in charge amount distribution, higher in charge amount uniformity, better in charge rise profile (high in charge rise speed), lower in environmental dependency, and when used in toner, it is better in durability in multiple repeated use of toner, less influential on toner fixability and offset quality, and better in safety to the human body, as compared to commercially available conventional charge control agents comprising monoazo metal complex compounds.

The toner of the present invention for developing electrostatic images can comprise the charge control agent of the present invention, a resin, and a coloring agent.

The toner of the present invention for developing electrostatic images can serve well, as long as the charge control agent of the present invention is contained in an amount enabling the control of the toner charge. Preferable amounts of the charge control agent of the present invention added are 0.1 to 10 parts by weight, more preferably 0.5 to 5 parts by weight, of the aforementioned monoazo metal complex compound containing composition (charge control agent of the present invention), per 100 parts by weight of the resin.

As examples of resins that can be used for the toner of the present invention, there may be mentioned the following resins known as toner resins or binder resins. Specifically, useful resins include styrene resin, styrene-acrylic resin, styrene-butadiene resin, styrene-maleic acid resin, styrene-vinyl methyl ether resin, styrene-methacrylate copolymer, phenol resin, epoxy resin, polyester resin, polypropylene resin, and paraffin wax. These resins may be used singly or in blends of several kinds.

The toner of the present invention may incorporate various dyes or pigments as coloring agents. Examples of useful dyes and pigments include the following. Specifically, there may be mentioned organic pigments such as Quinophthalone Yellow, Isoindolinone Yellow, Perinone Orange, Perylene Maroon, Rhodamine 6G Lake, Quinacridone Red, Rose Bengale, Copper Phthalocyanine Blue, Copper Phthalocyanine Green and diketopyrrolopyrrole pigments; inorganic pigments such as Carbon Black, Titanium White, Titanium Yellow, Ultramarine, Cobalt Blue and red iron oxide; various oil soluble dyes and disperse dyes such as azo dyes, quinophthalone dyes, anthraquinone dyes, phthalocyanine dyes, indophenol dyes and indoaniline dyes; and triarylmethane dyes and xanthene dyes modified with resins such as rosin, rosin-modified phenol, and rosin-modified maleic acid. These coloring agents may be used singly or in blends of two or more kinds.

Also, to improve toner quality, additives, e.g., electroconductive particles, fluidity-improving agents and anti-image-peeling agents, can be added to the toner internally or externally.

The toner of the present invention for developing electrostatic images can, for example, be produced as described below. Specifically, a toner having a mean particle diameter of 1 to 15 µm, for example, can be obtained by thoroughly mixing a resin and a coloring agent as described above, and the charge control agent of the present invention, and, if necessary, a magnetic material, a fluidizing agent and other additives, using a ball mill or another mechanical mixer, subsequently kneading the mixture in a molten state using a hot kneader such as a heat roll, kneader or extruder, cooling and solidifying the mixture, then pulverizing the solid and classifying the resulting particles by size.

Other applicable methods include the method in which the starting materials other than the binder resin are dispersed in a binder resin solution and subsequently spray dried to yield the desired toner, and the polymerization method in which a given set of starting materials are mixed in a monomer to constitute a binder resin to yield an emulsified suspension, which is then polymerized to yield the desired toner.

When the toner of the present invention for developing electrostatic images is used as a two-component developer, development can be achieved by the two-component magnetic brush developing process or the like using the toner of the present invention in mixture with carrier powder.

Usable carrier is not particularly limited. Any commonly known carrier can be used. Examples of usable carriers include iron powder, nickel powder, ferrite powder and glass beads about 50 to 200 µm in particle diameter, and such materials as coated with acrylate copolymer, styrene-acrylate copolymer, styrene-methacrylate copolymer, silicone resin, polyamide resin, ethylene fluoride resin or the like.

When the toner of the present invention for developing electrostatic images is used as a one-component developer, an appropriate amount of a fine powder of a ferromagnetic material, such as iron powder, nickel powder or ferrite powder, may be added and dispersed in preparing the toner as described above.

On the other hand, by adding the charge control agent of the present invention to a resin powder paint for electrostatic painting, the charge of the powder paint can be controlled or enhanced. Because a resin powder paint for electrostatic painting that contains the charge control agent of the present invention is excellent in heat resistance and good in charge enhancing characteristic, it exhibits high paint adhesion efficiency even without recovery and reuse (i.e. recycled use). Painting using the powder paint can be achieved using an electrostatic powder painting method such as the corona application method, the frictional charging method or the hybrid method.

It is also possible to obtain a frictional charge providing element capable of providing a charge for a toner for developing electrostatic images, by coating the surface of a carrier, a cylindrical sleeve of a transportation member for a toner, a doctor blade or the like, with the monoazo metal complex compound containing composition of the present invention as a charge control agent, by dipping, spraying, brush application or the like.

This frictional charge providing element is capable of producing toner images of high quality comparable to that of initial images even after continuous copying because the monoazo metal complex compound containing composition used stably provides a positive charge for a toner. In addition, this frictional charge providing element may also comprise a small amount of an auxiliary positive charge providing agent.

The monoazo metal complex compound containing composition of the present invention is used as an absorbent dye for ultraviolet light, visible light, infrared light, and the like. Specifically, it is used in dyes (coloring agents) for writing inks, recording inks (including inkjet inks), leather, plastics, etc, near infrared absorbent dyes. Because the monoazo metal complex compound containing composition of the present invention possesses a practically satisfactory coloring characteristic for a coloring agent, and because it is of high purity with impurity substances removed previously, its solubility is very stable, it exhibits almost no transfer, such as bleeding due to impurity substances, its heat resistance and light fastness are excellent, and its fading is slow with almost no hue change during color fading.

In addition, inks and dense solutions containing the monoazo metal complex compound containing composition of the present invention as a dye are excellently stable over time with no time-related thickening or dye deposition because the dye dissolution stability is good so that crystal deposition or dye association due to impurity substances does not occur.

Furthermore, the monoazo metal complex compound containing composition of the present invention is useful as, for example, a dye for coloring a thermoplastic resin composition. When it is formulated as a coloring agent for plastics, especially as a coloring agent for plastic products used during a long time of direct contact with the human skin, e.g., plastic eyeglass frames, it is excellently harmless to the human body with almost no skin sensitizing potential as exhibited by conventional azo disperse dyes.

In addition, the colored thermoplastic resin composition of the present invention is excellent in uniform colorability, light fastness and heat resistance, and its molded product has improved gloss and appearance, because the monoazo metal complex compound containing composition of the present invention used as the coloring agent is of high purity and is good in dispersibility and/or solubility in thermoplastic resins.

The following crystalline thermoplastic resins, for example, can be used for the colored thermoplastic resin composition of the present invention. Specifically, there may be mentioned polyamide resin, polyethylene resin, polypropylene resin, polyester resin (polyethylene terephthalate resin, polybutylene terephthalate resin, etc.), polyphenylene sulfide resin and polyether ether ketone resin. Of these thermoplastic resins, polyamide resin, polyester resin (polyethylene terephthalate resin, polybutylene terephthalate resin, etc.) and polyphenylene sulfide resin are preferred. These thermoplastic resins may be used singly or in combination of two or more kinds. In addition, as other examples of thermoplastic resins that can be used for the colored thermoplastic resin composition of the present invention, there may be mentioned copolymers or mixtures mainly comprising these polymers; thermoplastic resins prepared by formulating an elastomer such as rubber or rubber-like resin therein; and polymer alloys containing not less than 10% by weight of these resins.

Examples of such polyamide resins include nylon 6, nylon 66, nylon 46, nylon 11, nylon 12, nylon 69, nylon 610, nylon 612, nylon 96, amorphous nylon, nylon RIM, nylon MIX 6, and copolymers of two or more thereof, such as nylon 6/66 copolymer, nylon 6/66/610 copolymer, nylon 6/66/11/12 copolymer, and crystalline nylon/amorphous nylon copolymer. In addition, the polyamide resin for the present invention may be a polymer alloy of polyamide resin and another synthetic resin. Examples of such alloys include polyamide/polyester alloy, polyamide/polyphenylene oxide alloy, polyamide/polycarbonate alloy, polyamide/polyolefin alloy, polyamide/styrene/acrylonitrile alloy, polyamide/acrylic acid ester alloy, and polyamide/silicone alloy. These polyamide resins may be used singly or in combination of two or more kinds.

The colored thermoplastic resin composition of the present invention may contain appropriate amounts of various fibrous reinforcing materials according to its use and purpose. Any fibrous reinforcing material can be used for the colored thermoplastic resin composition and fiber-reinforced colored thermoplastic resin molded product of the present invention, as long as it can be used to reinforce conventional synthetic resins. Examples of such fibrous reinforcing materials include glass fiber, carbon fiber and various organic fibers. In the case of glass fiber, for example, its content is preferably set at 5 to 120% by weight relative to 100% by weight of the thermoplastic resin (preferably crystalline thermoplastic resin). If the glass fiber content is under 5% by weight, satisfactory reinforcing effect is difficult to achieve with the glass fiber; if the glass fiber content exceeds 120% by weight, the moldability tends to decrease. The glass fiber content is preferably 10 to 60% by weight, particularly preferably 20 to 50% by weight.

The colored thermoplastic resin composition of the present invention and the fiber-reinforced colored thermoplastic resin molded product of the present invention may be formulated with various commonly known additives to confer desired characteristics according to the objective. Examples of such additives include auxiliary colorants, modifiers, ultraviolet absorbents or light stabilizers, antioxidants, antibacterial/antifungal agents, flame retarders, inorganic fillers, dispersing agents, stabilizers, plasticizers, antistatic agents and elastomers for improved impact resistance.

Auxiliary colorants include, for example, inorganic pigments, organic pigments or organic dyes used in small amounts to enhance the coloring power, to improve the heat resistance and light fastness, or to adjust the color tone.

Examples of modifiers include silicon compounds such as amino-modified silicone oil and alkyl-modified silicone oil, and waxes.

Examples of ultraviolet absorbents or light stabilizers include benzotriazole compounds, benzophenone compounds, salicylate compounds, cyanoacrylate compounds, benzoate compounds, oxalide compounds, hindered amine compounds and niccolates.

Examples of antioxidants include phenol compounds, phosphorus compounds, sulfur compounds and thioether compounds.

Examples of antibacterial/antifungal agents include 2-(4'-thiazolyl)-benzimidazole, 10,10'-oxybisphenoxarsine, N-(fluorodichloromethylthio)phthalimide and bis(2-pyridylthio-1-oxide)zinc.

Examples of flame retarders include halogen containing compounds such as tetrabromobisphenol A derivatives, hexabromodiphenyl ether and tetrabromophthalic anhydride; phosphorus containing compounds such as triphenyl phosphate, triphenyl phosphite, red phosphorus and ammonium polyphosphate; nitrogen containing compounds such as urea and guanidine; silicon containing compounds such as silicone oil, organic silane and aluminum silicate; and antimony compounds such as antimony trioxide and antimony phosphate.

Examples of inorganic fillers include glass flake, glass beads, silica, quartz, amorphous silicic acid, talc, magnesium carbonate, calcium carbonate, alumina, metal powder, kaolin, calcium silicate, mica and wollastonite.

The colored thermoplastic resin composition of the present invention can be prepared by formulating the starting materials by an optionally chosen method of formulation. Normally, it is preferable to mix these components as uniformly as possible. For example, a colored thermoplastic resin composition can be prepared by uniformly mixing all starting materials in a mechanical mixer such as a blender, a kneader, a banbury mixer, a roll or an extruder. Alternatively, it can be obtained by mixing some starting materials in a mechanical mixer, and subsequently adding the remaining components and uniformly mixing them. It can also be obtained as colored grains (colored pellets) by kneading the starting materials, previously dry blended, in a molten state using a heated extruder, to obtain a uniform mixture, extruding the mixture into a needle form, and subsequently cutting it into pieces of desired length.

In addition, a master batch of the colored thermoplastic resin composition of the present invention can be obtained by an optionally chosen method. For example, it can be obtained by mixing a thermoplastic resin (preferably a crystalline thermoplastic resin) as the master batch base, in a powder or pellet form, and the monoazo metal complex compound containing composition of the present invention as a coloring agent, in a mechanical mixer such as a tumbler or a super-mixer, and pelletizing or coarsely granulating the mixture by the hot melt method using an extruder, a batch kneader, a roll kneader, or the like. A master batch can also be obtained by adding the monoazo metal complex compound containing composition of the present invention as a coloring agent to a thermoplastic resin for master batch remaining in a molten state after synthesis, then removing the solvent.

The colored thermoplastic resin composition of the present invention can be molded by various procedures in common use. For example, it can be molded from colored pellets using a molding machine such as an extruder, an injection molding machine or a roll mill. In addition, it can be molded by mixing in an appropriate mixer a thermoplastic resin, in a pellet or powder form, the monoazo metal complex compound containing composition of the present invention in a pulverized form as a coloring agent, and various additives used as necessary, and molding this mixture using a molding machine. It is also possible to add the monoazo metal complex compound containing composition of the present invention as a coloring agent to a monomer containing an appropriate polymerization catalyst, polymerize this mixture into a desired crystalline thermoplastic resin, and mold this resin by an appropriate method. Molding can be achieved by any molding methods in common use, including injection molding, extrusion molding, compression molding, foaming molding, blow molding, vacuum molding, injection blow molding, rotational molding, calendering and solution casting.

EXAMPLES

The present invention is hereinafter described in more detail by means of the following examples, which are not to be construed as limitative. In the description below, "part(s) by weight" is referred to as "part(s)".

Examples 1 and 2 and Comparative Examples 1 and 2 concern the production of the monoazo metal complex compound containing composition of the present invention.

Example 1

(a) Synthesis of Monoazo Dye

Water 300 ml

Hydrochloric acid 20.0 g 4-chloro-2-aminophenol 28.6 g

After an aqueous solution comprising the above ingredients was cooled to 5° C. a solution of 14.0 g of sodium nitrite in 60 ml of water was added to the solution drop by drop over a period of 30 minutes. This mixture was stirred at 5 to 15° C. for 1 hour, after which the reaction mixture was filtered, to yield an aqueous solution of the diazonium salt of 4-chloro-2-aminophenol (solution A).

Water 400 ml

Sodium hydroxide 14.0 g 2-naphthol 28.8 g

Subsequently, the aforementioned solution A was added drop by drop over a period of 40 minutes to an aqueous solution of the ingredients shown above, after which this mixture was stirred for 3 hours. The precipitated reaction product was collected by filtration, washed with water, and dried at 100° C., to yield 62.0 g of 1-(5-chloro-2-hydroxyphenyl) azo-2-hydroxynaphthalene (monoazo dye).

(b) Synthesis of Monoazo Metal Complex Compound

Monoazo dye obtained in (a) 62.0 g

Chromium formate 19.2 g

Ethylene glycol monoethyl ether 200 g

After the above ingredients were mixed and stirred at 130° C. for 6 hours, this mixture was cooled to 90° C., and the reaction mixture was dispersed in an aqueous solution of 15 g of hydrochloric acid in 200 ml of water. The solid was separated from this dispersion by filtration and washed with 1200 ml of water, after which it was dried at 100° C. The black product obtained was milled to yield 60 g of a non-purified monoazo metal complex compound (composition containing a monoazo metal complex compound).

(c) Purification Process 60 g of the non-purified monoazo metal complex compound (composition containing a monoazo metal complex compound) was dispersed in 120 g of methanol and stirred at 63° C. for 1 hour, after which it was cooled to 30° C. and filtered through Toyo Filter Paper No. 2. The wet cake obtained was further washed with 20 g of methanol on filter paper and dried at 50° C. under reduced pressure to yield 56.4 g of a purified black product (monoazo metal complex compound containing composition 1).

Figure 1:
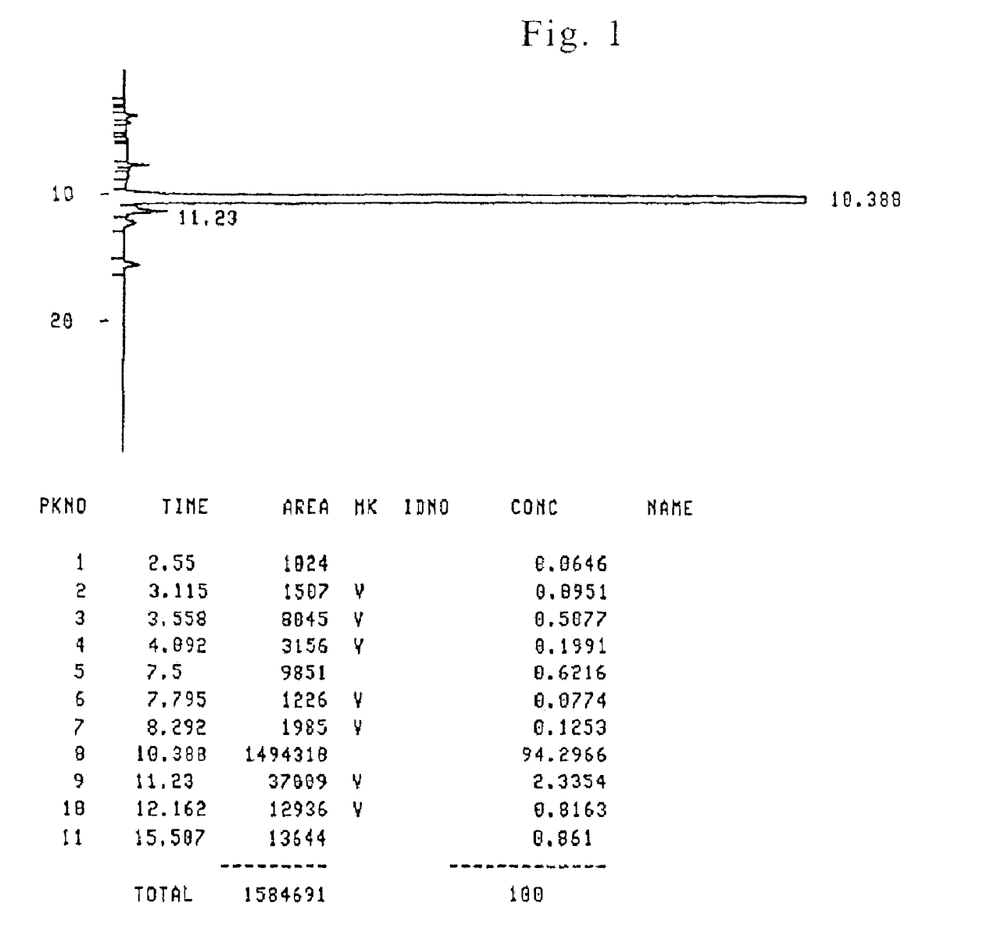
FIG. 1 shows high performance liquid chromatography data for the monoazo metal complex compound obtained in Example 1.
Figure 2:
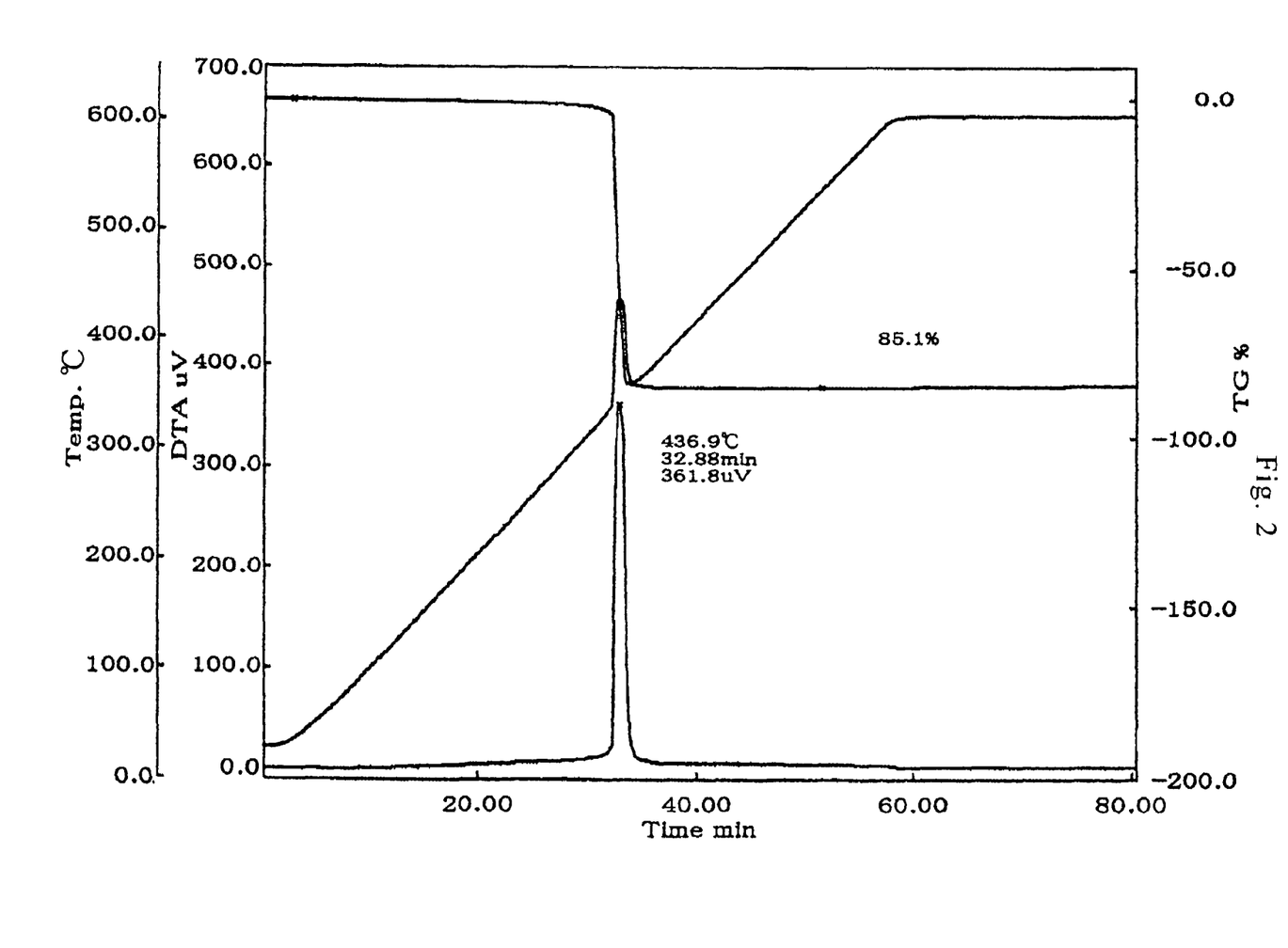
FIG. 2 shows a TG/DTA chart of the monoazo metal complex compound obtained in Example 1.

The purified monoazo metal complex compound (monoazo metal complex compound containing composition 1) was analyzed by high performance liquid chromatography and its purity was determined to be 94.3% (high performance liquid chromatography data presented in FIG. 1). The incidence of skin sensitization in a skin sensitization potential test based on the maximization method was 10%. A TG/DTA chart of the purified monoazo metal complex compound (monoazo metal complex compound containing composition 1) is shown in FIG. 2.

High performance liquid chromatography (HPLC) operating conditions (the same applies to the high performance liquid chromatography analysis described below) Column: L-column ODS (produced by the Chemicals Inspection & Testing Institute, Japan)

Eluent: Mixture of 80 parts by volume of acetonitrile, 1 part by volume of triethylamine, 3 parts by volume of acetic acid, and 16 parts by volume of water Flow rate: 1.0 ml/min Column temperature: 45° C.

Measuring wavelength: 313 nm

Injection volume: 10 μl

Sample preparation: 10 mg/10 cc (80 parts by volume of acetonitrile and 20 parts by volume of water)

Example 2

Monoazo dye obtained in Example 1 (a) 62.0 g

Chromium formate 19.2 g

Ethylene glycol monoethyl ether 200 ml

After the above ingredients were mixed and stirred at 130° C. for 6 hours, this mixture was cooled to 30° C. The solid was separated from the reaction mixture by filtration and washed with 100 ml of water on filter paper, after which its wet cake was dispersed again in an aqueous solution of 15 g of hydrochloric acid in 200 ml of water and stirred for 1 hour. Subsequently, the solid was again separated by filtration and washed with 1200 ml of water, after which it was dried at 100° C. and milled to yield 56.6 g of a purified black product (monoazo metal complex compound containing composition 2).

The purified monoazo metal complex compound (monoazo metal complex compound containing composition 2) was analyzed by high performance liquid chromatography and its purity was determined to be 95.9%. The incidence of skin sensitization in a skin sensitization potential test based on the maximization method was 10%.

Comparative Example 1

Monoazo dye obtained in Example 1 (a) 62.0 g

Chromium formate 19.2 g

Ethylene glycol monoethyl ether 200 ml

After the above ingredients were mixed and stirred at 130° C. for 6 hours, this mixture was cooled to 90° C. This reaction mixture was dispersed in an aqueous solution of 15 g of hydrochloric acid in 200 ml of water. The solid was separated from this dispersion by filtration and washed with 1200 ml of water, after which it was dried at 100° C. and milled, to yield 60 g of a non-purified black product (composition containing a monoazo metal complex compound).

Figure 3:
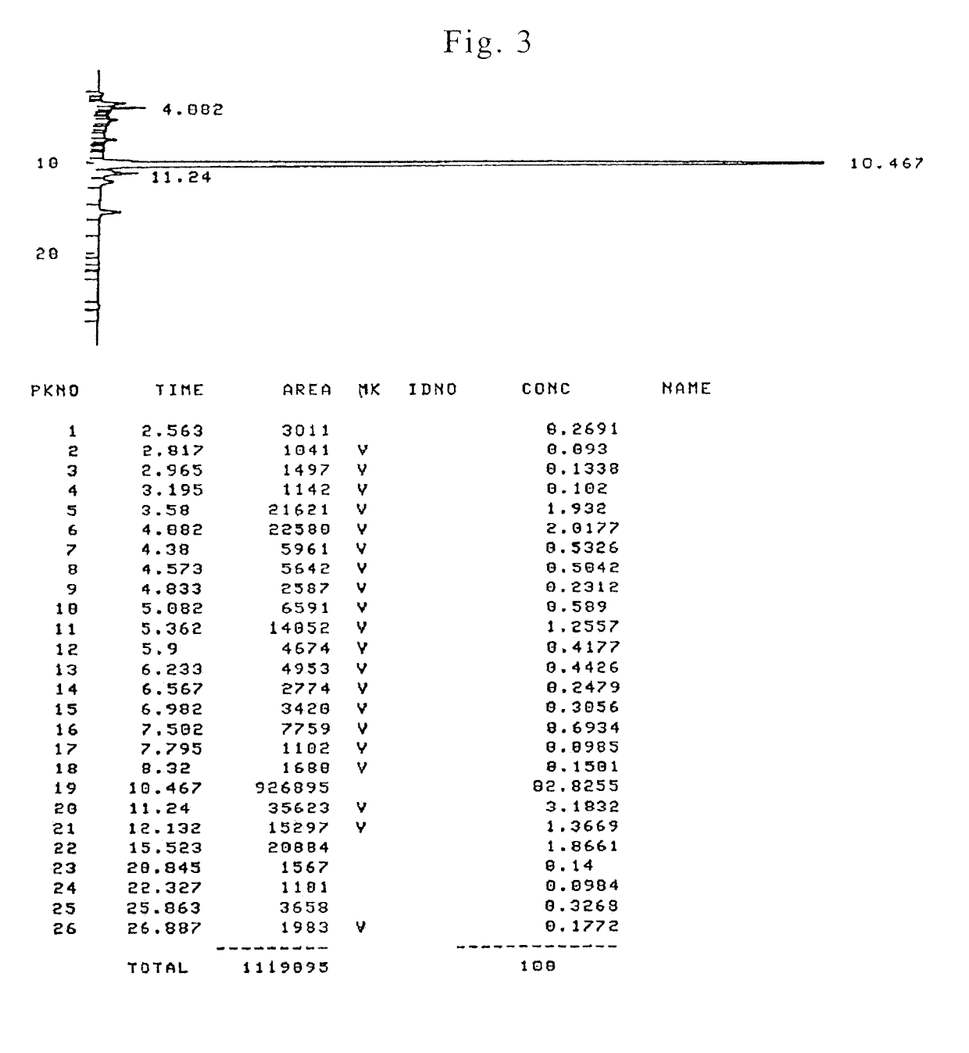
FIG. 3 shows high performance liquid chromatography data for the monoazo metal complex compound obtained in Comparative Example 1.

This non-purified monoazo metal complex compound (composition containing a monoazo metal complex compound) was analyzed by high performance liquid chromatography, and its purity was determined to be 82.8% (high performance liquid chromatography data presented in FIG. 3). The incidence of skin sensitization in a skin sensitization potential test based on the maximization method was 90%.

Comparative Example 2

Figure 4:
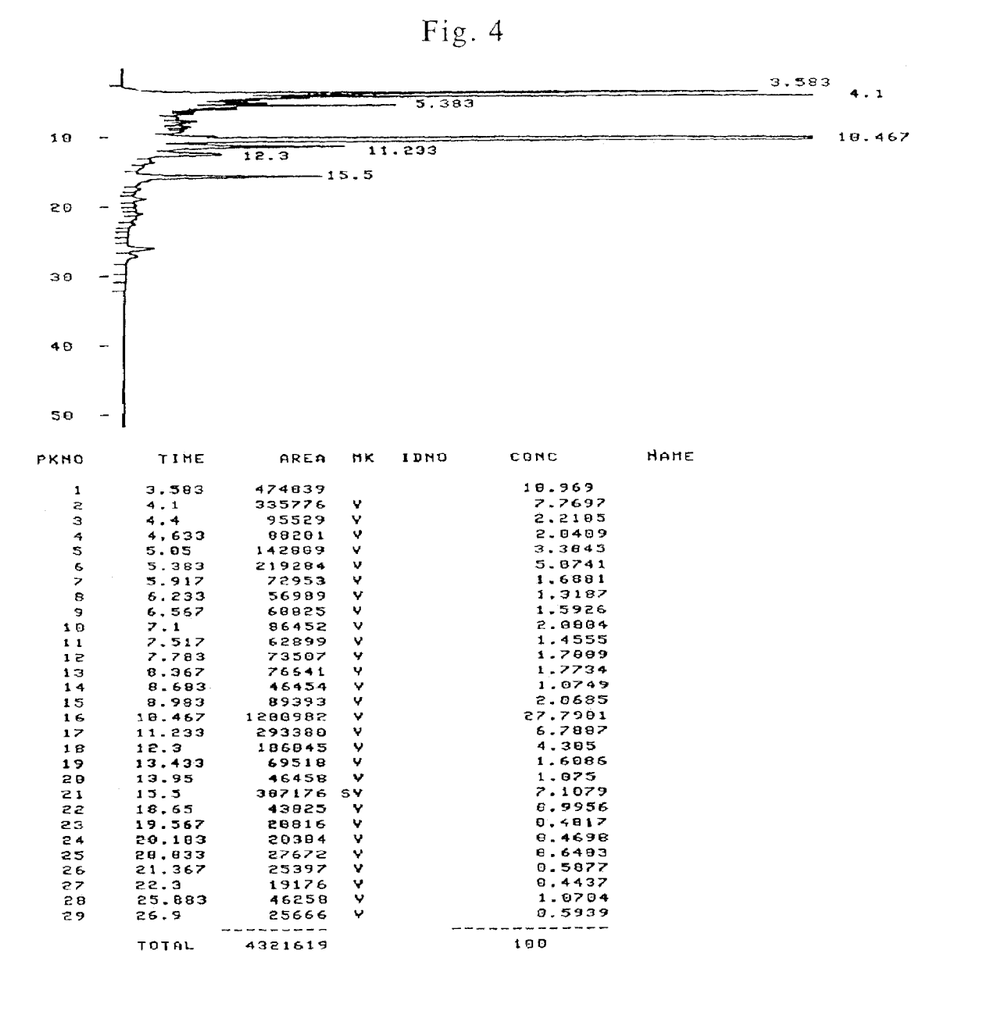
FIG. 4 shows high performance liquid chromatography data for the monoazo metal complex compound obtained in Comparative Example 2.
Figure 5:
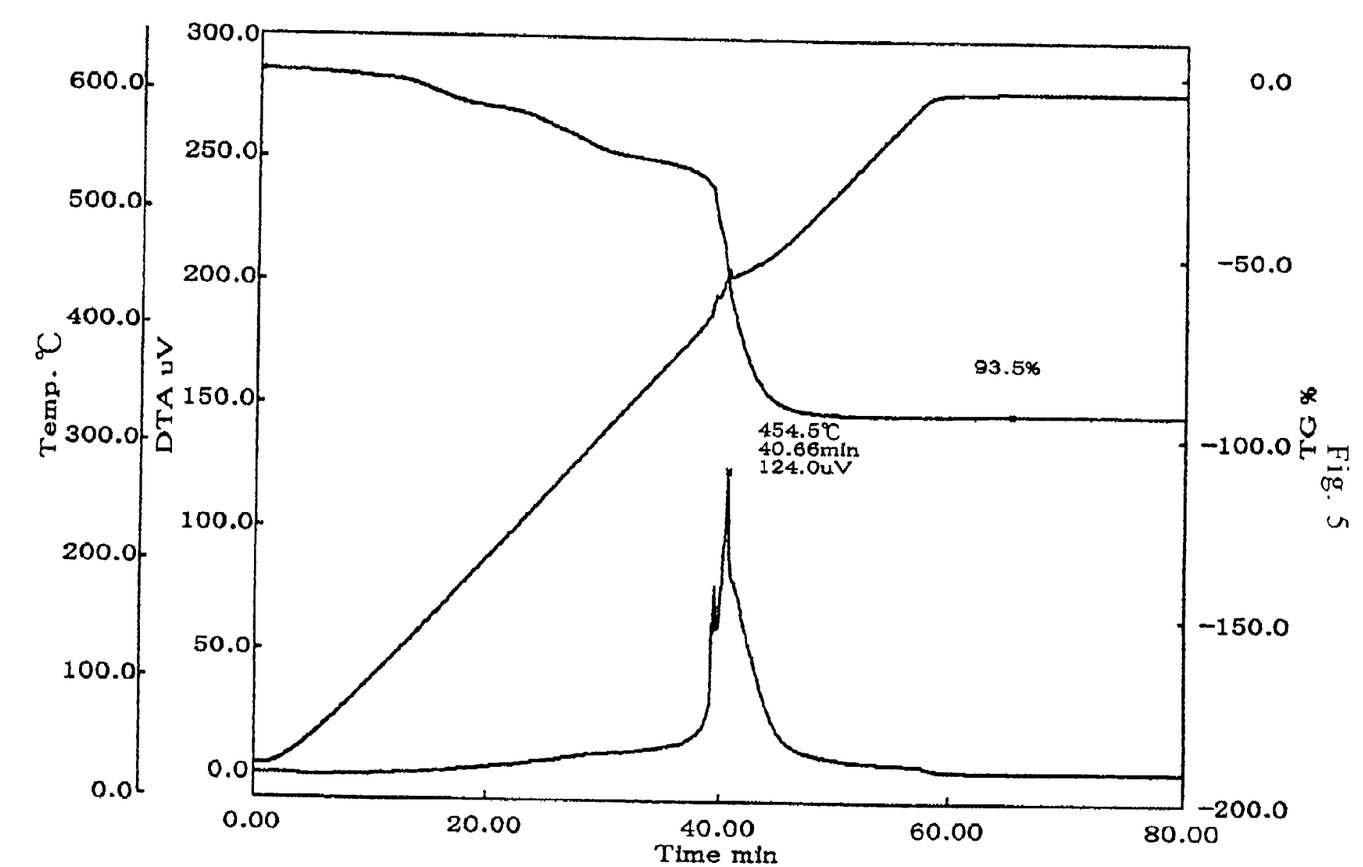
FIG. 5 shows a TG/DTA chart of the monoazo metal complex compound obtained in Comparative Example 2.

50 g of the non-purified monoazo metal complex compound (composition containing a monoazo metal complex compound) obtained in Comparative Example 1 was dispersed in 100 g of methanol and stirred under refluxing at 63° C. for 1 hour, after which it was cooled to 30° C. and filtered through Toyo Filter Paper No. 2. The entire portion of the filtrate obtained was dispersed in an aqueous solution of 15 g of hydrochloric acid in 200 ml water. The solid was separated from the dispersion by filtration and washed with 1200 ml of water, after which it was dried at 100° C. and milled, to yield 3.4 g of a black powder (composition containing a monoazo metal complex compound). This black powder was analyzed by high performance liquid chromatography, and its purity was determined to be 27.8% (high performance liquid chromatography data presented in FIG. 4). The incidence of skin sensitization in a skin sensitization potential test based on the maximization method was 100%. A TG/DTA chart of this black powder is shown in FIG. 5.

The sensitizing potentials, purities, X-ray diffraction profiles, and mean particle diameters of the substances obtained in Examples 1 and 2 and Comparative Examples 1 and 2 are shown in Table 1.

TABLE 1

| | Sensitization by the maximization method | | | | |
|---|---|---|---|---|---|
| | Number of samples with sensitization signs found/number of samples analyzed | Percent Incidenc (%) | HPLC-determined purity (%) | X-ray Diffraction | Mean particle diameter (μm) |
| Example 1 | 1/10 | 10 | 94.2 | Crystalline | 6.74 |
| Example 2 | 1/10 | 10 | 95.9 | Crystalline | 6.28 |
| Comparative Example 1 | 9/10 | 90 | 82.8 | Crystalline | 6.23 |
| Comparative Example 2 | 10/10 | 100 | 27.8 | Amorphous | 6.50 |

Examples 3 and 4 and Comparative Examples 3 and 4 concern toners for developing electrostatic images that incorporate the monoazo metal complex compound containing composition of the present invention as a charge control agent.

Example 3

Styrene-acrylic copolymer resin (produced by Mitsui Chemical Co., Ltd., trade name. CPR600B) . . . 100 parts Carbon Black (produced by Mitsubishi Chemical Co., Ltd., trade name: MA-100) . . . 7 parts Low polymer polypropylene (produced by Sanyo Kasei Co., Ltd., trade name: Biscal 550P) . . . 3 parts Charge control agent (monoazo metal complex compound containing composition 1) . . . 3 parts The above ingredients were uniformly pre-mixed using a high-speed mixer to yield a premix, which was then kneaded in a molten state using a heat roll, cooled and thereafter roughly milled using a vibration mill. The rough milling product obtained was finely pulverized using an air jet mill equipped with a mechanical classifier to yield a black toner 5 to 15 μm in particle diameter.

Five parts of this toner was admixed with 95 parts of an iron powder carrier (produced by Powdertech, TEFV200/300) to yield a developer.

When this toner was used to repeatedly form images, the charge rise profile, charge stability and sustainability were good, the image density was stable from the initial time to completion of continuous copying, and high-quality black images with no fogging etc. were obtained.

Figure 6:
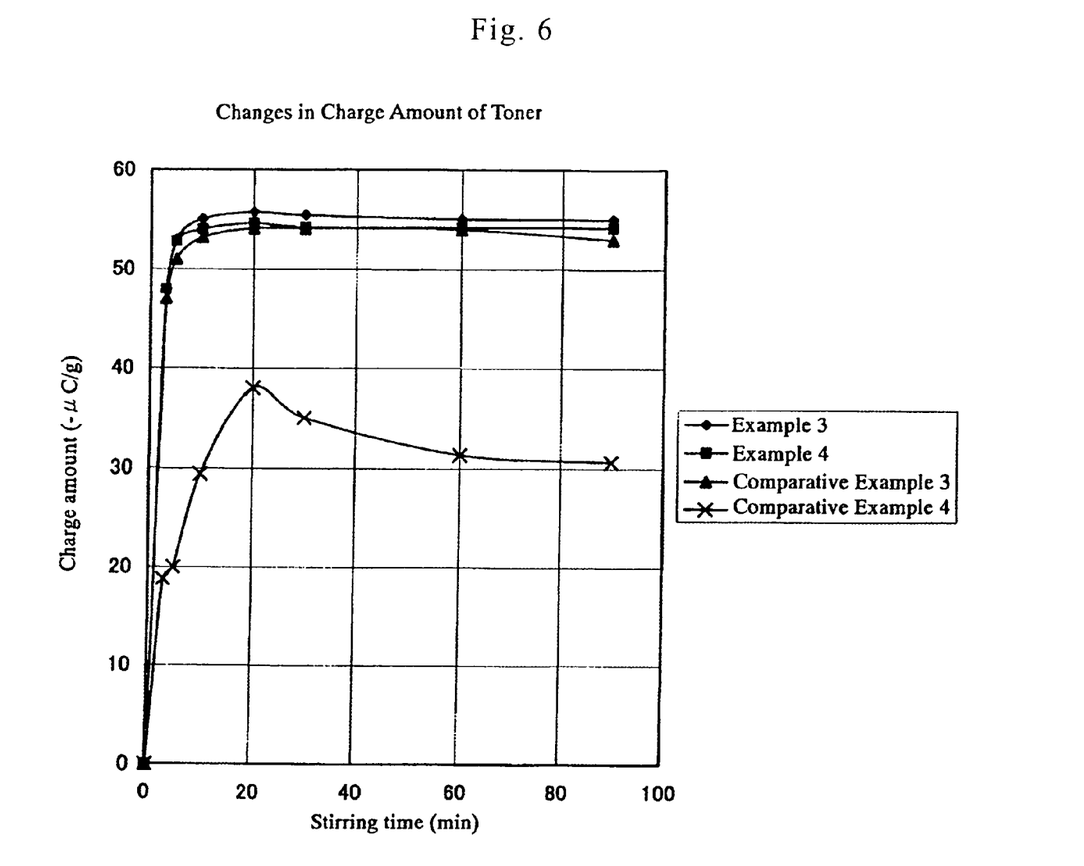
FIG. 6 shows changes in the charge amounts of the toners of Examples 3 and 4 and Comparative Examples 3 and 4.

After this developer was stirred for a preset time, the amount of blowoff charges was determined using a blowoff charge tester (produced by Toshiba Chemical). The amount of saturated charges was determined to be −55.7 μC/g. The results of determination are shown in Table 2 and FIG. 6.

Example 4

In the same manner as in Example 3, except that the charge control agent used in Example 3 was replaced with the monoazo metal complex compound containing composition 2 obtained in Example 2, a toner was obtained, a developer was prepared, and the amount of blowoff charges was determined. The amount of saturated charges was determined to be −54.6 μC/g. The results of determination are shown in Table 2 and FIG. 6.

Comparative Example 3

In the same manner as in Example 3, except that the charge control agent used in Example 3 was replaced with the non-purified monoazo metal complex compound (composition containing a monoazo metal complex compound) obtained in Comparative Example 1, a toner was obtained and a developer was prepared. When this developer was used to repeatedly form images, the charge rise profile, charge stability, and sustainability were good, the image density was stable from the initial time to completion of continuous copying, and high-quality black images with no fogging etc. were obtained. When the amount of blowoff charges was determined in the same manner as in Example 3, the amount of saturated charges was determined to be −54.1 μC/g. The results of determination are shown in Table 2 and FIG. 6.

Comparative Example 4

In the same manner as in Example 3, except that the charge control agent used in Example 3 was replaced with the methanol-soluble black powder (composition containing a monoazo metal complex compound) obtained in Comparative Example 2, a toner was obtained and a developer was prepared. When this developer was used to repeatedly form images, fogging occurred and no satisfactory images were obtained with density reduction as compared to initial images. When the amount of blowoff charges was determined in the same manner as in Example 3, the amount of saturated charges was determined to be −38.0 μC/g. The results of determination are shown in Table 2 and FIG. 6.

TABLE 2

| Toner | Charge control agent | Amount of saturated charges after toner formation (−μC/g) |
|---|---|---|
| Example 3 | Example 1 | 55.7 |
| Example 4 | Example 2 | 54.6 |
| Comparative Example 3 | Comparative Example 1 | 54.1 |
| Comparative Example 4 | Comparative Example 2 | 38.0 | examples 5 and 7 and Comparative Examples 5 and 6 concern colored polyamide resin compositions that incorporate the monoazo metal complex compound containing composition of the present invention as a dye.

Example 5

1000 g of a polyamide resin (produced by Dupont, trade name: Zytel 101 L-NC10) and 30 g of the monoazo metal complex compound containing composition 1 of Example 1 (black dye as a coloring agent) were placed in a stainless steel tumbler and stirred vigorously for 20 minutes.

This mixture was kneaded in a molten state at 300° C. using a vent type extruding machine (produced by Enpura Sangyo, trade name: E30SV) and treated by a conventional method to yield colored pellets, which were vacuum-dried at 120° C. for 6 hours.

After pellet drying, a test piece was prepared at 280 to 300° C. by an ordinary method using an injection molding machine (produced by Kawaguchi Tekko, trade name: KM-50C). A reddish black molded test piece with good compatibility between the resin and the dye [48×86×3 (mm)] was obtained.

The results of evaluation and measurement of the appearance and surface gloss of this molded test piece are shown in Table 3.

(1) Appearance and Surface Gloss (Visual Evaluation of Coloring Condition)

The test piece was examined visually under standard light C (JIS L0804) to evaluate its coloring condition.

Evaluation Criteria for Coloring

◎: Uniformly and vividly colored and rich in gloss.

○: Uniformly colored and glossy.

Δ: Partially ununiformly colored and partially glossless.

×: Totally ununiformly colored and glossless.

(2) Light Fastness Test and Evaluation

Using the Sunshine xenon long-life weather meter (produced by Shimadzu Corporation, trade name: XW-1200A), the test piece was exposed to light for 200 hours in a cycle of the 006 test conditions (phases 1 and 2 repeated under the conditions shown below), after which its grade was determined on the BLUE SCALE (JIS L0841 method).

In general, test pieces rated lower are judged to have greater discoloration and fading.

| Light fastness test conditions with Sunshine xenon long-life weather meter | | |
|---|---|---|
| [Setting item] | [Phase 1] | [Phase 2] |
| Irradiance (Wm/2) (E) | 70 | 70 |
| Black standard temperature (° C.) | 63 | 50 |
| Rainfall test | No | Yes |
| Humidity (%) | 60 | — |
| Time (min) | 120 | 18 |

(3) Heat Resistance Test and Evaluation 1000 g of a thermoplastic resin and 0.5 g of a coloring agent were placed in a stainless steel tumbler and stirred vigorously for 1 hour. This mixture was kneaded in a molten state using a vent type extruding machine and treated by a conventional method to yield colored pellets. After these colored pellets were vacuum-dried at 120° C. for 6 hours, a molded test piece was prepared with the pellets by an ordinary method using an injection molding machine, and this molded test piece was used as the standard test piece. Separately, the colored pellets were kept at 310° C. for 5 minutes in an injection molding machine, after which a molded test piece was prepared. This molded test piece and the standard molded test piece were compared on the BLUE SCALE (JIS L0841) to determine its grade. In general, test pieces rated lower are judged to have greater discoloration and fading.

Example 6

In the same manner as in Example 5, except that the monoazo metal complex compound containing composition 1 was replaced with 30 g of the monoazo metal complex compound containing composition 2 of Example 2 (black dye as a coloring agent), a uniformly colored reddish black molded test piece [48×86×3 (mm)] with good appearance and surface gloss was obtained.

This molded test piece was tested and evaluated for appearance/surface gloss, light fastness, and heat resistance in the same manner as in Example 5. The results are shown in Table 3.

Example 7

100 g of glass-reinforced nylon 66 (fiber-reinforced polyamide resin with a mixing ratio by weight of polyamide resin:glass fiber=67:33, produced by Dupont, trade name: 70G33L) and 30 g of the monoazo metal complex compound containing composition 1 of Example 1 (black dye as a coloring agent) were placed in a stainless steel tumbler and stirred vigorously for 20 minutes.

This mixture was kneaded in a molten state at 300° C. using a vent type extruding machine (produced by Enpura Sangyo, trade name: E30SV) and treated by a conventional method to yield colored pellets, which were vacuum-dried at 120° C. for 6 hours.

After pellet drying, a test piece was prepared at 280 to 300° C. with the pellets by an ordinary method using an injection-molding machine (produced by Kawaguchi Tekko, trade name: KM50-C). A reddish black molded test piece with good compatibility between the resin and the dye [48×86×3 (mm)] was obtained.

Comparative Example 5

In the same manner as in Example 5, except that the monoazo metal complex compound containing composition 1 in Example 5 was replaced with 30 g of the non-purified monoazo metal complex compound (composition containing a monoazo metal complex compound) obtained in Comparative Example 1, a uniformly colored reddish black molded test piece [48×86×3 (mm)] was obtained.

This molded test piece was tested and evaluated for appearance/surface gloss, light fastness, and heat resistance in the same manner as in Example 5. The results are shown in Table 3.

Comparative Example 6

In the same manner as in Example 5, except that the monoazo metal complex compound containing composition 1 in Example 5 was replaced with the methanol-soluble black powder obtained in Comparative Example 2 (composition containing a monoazo metal complex compound), an ununiformly colored red molded test piece [48×86×3 (mm)] was obtained.

This molded test piece was tested and evaluated for appearance/surface gloss, light fastness, and heat resistance in the same manner as in Example 5. The results are shown in Table 3.

TABLE 3

|  | Coloring agent | Appearance/ surface gloss | Light fastness test | Heat resistance test |
| --- | --- | --- | --- | --- |
| Example 5 | Example 1 | ⊚ | Grade 8 | Grade 7 |
| Example 6 | Example 2 | ⊚ | Grade 8 | Grade 7 |
| Comparative Example 5 | Comparative Example 1 | ○ | Grade 6 | Grade 5 |
| Comparative Example 6 | Comparative Example 2 | X | Grade 3 | Grade 3 |

What is claimed is:

1. Colored thermoplastic molding resin composition consisting essentially of a monoazo metal complex compound containing colorant composition and a thermoplastic resin, the incidence of skin sensitization in a skin sensitization potential test, based on the maximization method, of said colorant composition being not more than 20%, the purity of said monoazo metal complex compound containing colorant composition being not less than 90% as determined by separation of the colorant composition by high performance liquid chromatography, wherein the purity corresponds to the peak area percent of the monoazo metal complex peak using detection at 313 nm, said monoazo metal complex compound containing colorant composition being a compound of the following formula (1):

wherein each of $R^1$ through $R^4$ and $R^6$ independently represents a hydrogen atom, a normal or branched alkyl group having 1 to 18 carbon atoms, a normal or branched alkenyl group having 2 to 18 carbon atoms, a sulfonamide group, a mesyl group, a sulfonic acid group, a hydroxy group, an alkoxy group having 1 to 18 carbon atoms, an acetylamino group, a benzoylamino group, a halogen atom, or —COO—$R^7$;

$R^7$ represents a normal or branched alkyl group having 1 to 18 carbon atoms or an aryl group having 6 to 18 carbon atoms;

$R^5$ represents a hydrogen atom, a halogen atom, a nitro group, a carboxyl group, a normal or branched alkyl group having 1 to 18 carbon atoms, an alkenyl group having 2 to 18 carbon atoms, an alkoxy group having 1 to 18 carbon atoms, an aryl group having 6 to 18 carbon atoms, —COO—$R^8$ or $R^8$ represents a normal or branched alkyl group having 1 to 18 carbon atoms or an aryl group having 6 to 18 carbon atoms;

Y represents a hydrogen atom, a normal or branched alkyl group having 1 to 8 carbon atoms, an alkoxy group having 1 to 5 carbon atoms, a nitro group, or a halogen atom;

m represents an integer from 1 to 3;

M represents a divalent or trivalent metal;

p represents 1 or 2;

$(A)^{q+}$ represents $H^+$, $NH_4^+$, a cation based on an alkali metal, a cation based on an organic amine, or a quaternary organic ammonium ion;

q represents 1 or 2; and

X represents 1 or 2.

2. Resin composition of claim 1 wherein $R^2$ in Formula (1) above is Cl;

each of $R^1$ and $R^3$ through $R^5$ is a hydrogen atom;

$R^6$ is a hydrogen atom or a normal or branched alkyl group having 1 to 18 carbon atoms;

M is Cr, Fe or Cu; and $(A)^{q+}$ is $H^+$.

3. Resin composition of claim 1 wherein the thermoplastic resin is at least one resin selected from the group consisting of polyamide resin, polyethylene resin, polypropylene resin, polyester resin, polyphenylene sulfide resin and polyether ether ketone resin.

4. Resin composition of claim 1 wherein the thermoplastic resin contains fibrous reinforcing material.

5. Resin composition of claim 1 wherein the thermoplastic resin contains an inorganic filler.

6. Molded resin product made of a colored thermoplastic molding resin composition in molded form, consisting essentially of a purified monoazo metal complex compound containing colorant composition and a thermoplastic resin, the monoazo metal complex compound containing colorant being formed by the steps of providing a non-purified monoazo metal complex compound and purifying the non-purified monoazo metal complex compound to provide a purified monoazo metal complex compound containing colorant composition with the incidence of skin sensitization in a skin sensitization potential test, based on the maximization method, of said purified monoazo metal complex compound containing colorant composition being not more than 20%, the purity of said purified monoazo metal complex compound containing colorant composition being not less than 90% as determined by separation of the colorant composition by high performance liquid chromatography, wherein the purity corresponds to the peak area percent of the monoazo metal complex peak using detection at 313 nm, said purified monoazo metal complex compound containing colorant composition containing less than 10% of impurity substances of said non-purified monoazo metal complex compound associated with monoazo dyes and byproducts and impurity substances associated with metallization of monoazo dyes as determined by high performance liquid chromatography, said monoazo metal complex compound being a compound of the following formula (1):

wherein each of $R^1$ through $R^4$ and $R^6$ independently represents a hydrogen atom, a normal or branched alkyl group having 1 to 18 carbon atoms, a normal or branched alkenyl group having 2 to 18 carbon atoms, a sulfonamide group, a mesyl group, a sulfonic acid group, a hydroxy group, an alkoxy group having 1 to 18 carbon atoms, an acetylamino group, a benzoylamino group, a halogen atom, or —COO—$R^7$;

$R^7$ represents a normal or branched alkyl group having 1 to 18 carbon atoms or an aryl group having 6 to 18 carbon atoms;

$R^5$ represents a hydrogen atom, a halogen atom, a nitro group, a carboxyl group, a normal or branched alkyl group having 1 to 18 carbon atoms, an alkenyl group having 2 to 18 carbon atoms, an alkoxy group having 1 to 18 carbon atoms, an aryl group having 6 to 18 carbon atoms, —COO—$R^8$ or $R^8$ represents a normal or branched alkyl group having 1 to 18 carbon atoms or an aryl group having 6 to 18 carbon atoms;

Y represents a hydrogen atom, a normal or branched alkyl group having 1 to 8 carbon atoms, an alkoxy group having 1 to 5 carbon atoms, a nitro group, or a halogen atom;

m represents an integer from 1 to 3;

M represents a divalent or trivalent metal;

p represents 1 or 2;

$(A)^{q+}$ represents $H^+$, $NH_4^+$, a cation based on an alkali metal, a cation based on an organic amine, or a quaternary organic ammonium ion;

q represents 1 or 2; and

X represents 1 or 2.

7. Molded resin product of claim 6 wherein $R^2$ in Formula (1) above is Cl;

each of $R^1$ and $R^3$ through $R^5$ is a hydrogen atom;

$R^6$ is a hydrogen atom or a normal or branched alkyl group having 1 to 18 carbon atoms;

M is Cr, Fe or Cu; and $(A)^{q+}$ is $H^+$.

8. Molded resin composition of claim 6 wherein the thermoplastic resin is at least one resin selected from the group consisting of polyamide resin, polyethylene resin, polypropylene resin, polyester resin, polyphenylene sulfide resin and polyether ether ketone resin.

9. Molded resin composition of claim 6 wherein the thermoplastic resin contains fibrous reinforcing material.

10. Molded resin composition of claim 6 wherein the thermoplastic resin contains an inorganic filler.

11. Molded resin composition of claim 6 wherein the product is in the form of an eyeglass frame.

12. Method of providing a colored thermoplastic molding resin composition, the method comprising;

providing a thermoplastic resin;

providing a non-purified monoazo metal complex compound;

purifying the non-purified monoazo metal complex compound to provide a purified monoazo metal complex compound containing colorant composition, the incidence of skin sensitization in a skin sensitization potential test, based on the maximization method, of said purified monoazo metal complex compound containing colorant composition being not more than 20%, the purity of said purified monoazo metal complex compound being not less than 90% as determined by separation of the colorant composition by high performance liquid chromatography, wherein the purity corresponds to the peak area percent of the monoazo metal complex peak using detection at 313 nm, said purified monoazo metal complex compound containing colorant composition containing less than 10% of impurity substances of said non-purified monoazo metal complex compound as determined by high performance liquid chromatography;

mixing the purified monoazo metal complex compound containing colorant composition with said thermoplastic resin, said purified monoazo metal complex compound being a compound of the following formula (1):

(1)

wherein each of $R^1$ through $R^4$ and $R^6$ independently represents a hydrogen atom, a normal or branched alkyl group having 1 to 18 carbon atoms, a normal or branched alkenyl group having 2 to 18 carbon atoms, a sulfonamide group, a mesyl group, a sulfonic acid group, a hydroxy group, an alkoxy group having 1 to 18 carbon atoms, an acetylamino group, a benzoylamino group, a halogen atom, or —COO—$R^7$;

$R^7$ represents a normal or branched alkyl group having 1 to 18 carbon atoms or an aryl group having 6 to 18 carbon atoms;

$R^5$ represents a hydrogen atom, a halogen atom, a nitro group, a carboxyl group, a normal or branched alkyl group having 1 to 18 carbon atoms, an alkenyl group having 2 to 18 carbon atoms, an alkoxy group having 1 to 18 carbon atoms, an aryl group having 6 to 18 carbon atoms, —COO—$R^8$ or $R^8$ represents a normal or branched alkyl group having 1 to 18 carbon atoms or an aryl group having 6 to 18 carbon atoms;

Y represents a hydrogen atom, a normal or branched alkyl group having 1 to 8 carbon atoms, an alkoxy group having 1 to 5 carbon atoms, a nitro group, or a halogen atom;

m represents an integer from 1 to 3;

M represents a divalent or trivalent metal;

p represents 1 or 2;

$(A)^{q+}$ represents $H^+$, $NH_4^+$, a cation based on an alkali metal, a cation based on an organic amine, or a quaternary organic ammonium ion;

q represents 1 or 2; and

X represents 1 or 2.

13. Method of claim 12 wherein $R^2$ in Formula (1) above is Cl;

each of $R^1$ and $R^3$ through $R^5$ is a hydrogen atom;

$R^6$ is a hydrogen atom or a normal or branched alkyl group having 1 to 18 carbon atoms;

M is Cr, Fe or Cu; and $(A)^{q+}$ is $H^+$.

14. Method of claim 12 wherein the thermoplastic resin is at least one resin selected from the group consisting of polyamide resin, polyethylene resin, polypropylene resin, polyester resin, polyphenylene sulfide resin and polyether ether ketone resin.

15. Method of claim 12 wherein the thermoplastic resin contains fibrous reinforcing material.

16. Method of claim 12 wherein the thermoplastic resin contains an inorganic filler.

17. Method of providing a molded resin product, the method comprising:

providing a colored thermoplastic molding resin composition in molded form, the resin composition consisting essentially of a thermoplastic resin and a monoazo metal complex compound containing colorant composition, the incidence of skin sensitization in a skin sensitization potential test, based on the maximization method, of said colorant composition being not more than 20%, the purity of said monoazo metal complex compound being not less than 90% as determined by separation of the colorant composition by high performance liquid chromatography, wherein the purity corresponds to the peak area percent of the monoazo metal complex peak using detection at 313 nm, said colorant composition containing less than 10% of remaining starting materials and impurity substances associated with monoazo dyes and byproducts and impurity substances associated with metallization of monoazo dyes relative to said colorant composition as determined by high performance liquid chromatography; and molding the resulting resin composition including the monoazo metal complex compound containing colorant composition to form a molded resin product, said monoazo metal complex compound being a compound of the following formula (1):

(1)

wherein each of $R^1$ through $R^4$ and $R^6$ independently represents a hydrogen atom, a normal or branched alkyl group having 1 to 18 carbon atoms, a normal or branched alkenyl group having 2 to 18 carbon atoms, a sulfonamide group, a mesyl group, a sulfonic acid group, a hydroxy group, an alkoxy group having 1 to 18 carbon atoms, an acetylamino group, a benzoylamino group, a halogen atom, or —COO—$R^7$;

$R^7$ represents a normal or branched alkyl group having 1 to 18 carbon atoms or an aryl group having 6 to 18 carbon atoms;

$R^5$ represents a hydrogen atom, a halogen atom, a nitro group, a carboxyl group, a normal or branched alkyl group having 1 to 18 carbon atoms, an alkenyl group having 2 to 18 carbon atoms, an alkoxy group having 1 to 18 carbon atoms, an aryl group having 6 to 18 carbon atoms, —COO—$R^8$ or $R^8$ represents a normal or branched alkyl group having 1 to 18 carbon atoms or an aryl group having 6 to 18 carbon atoms;

Y represents a hydrogen atom, a normal or branched alkyl group having 1 to 8 carbon atoms, an alkoxy group having 1 to 5 carbon atoms, a nitro group, or a halogen atom;

m represents an integer from 1 to 3;

M represents a divalent or trivalent metal;

p represents 1 or 2;

$(A)^{q+}$ represents $H^+$, $NH_4^+$, a cation based on an alkali metal, a cation based on an organic amine, or a quaternary organic ammonium ion;

q represents 1 or 2; and

X represents 1 or 2.

18. Method of claim 17 wherein $R^2$ in Formula (1) above is Cl;

each of $R^1$ and $R^3$ through $R^5$ is a hydrogen atom;

$R^6$ is a hydrogen atom or a normal or branched alkyl group having 1 to 18 carbon atoms;

M is Cr, Fe or Cu; and $(A)^{q+}$ is $H^+$.

19. Method of claim 17 wherein the thermoplastic resin is at least one resin selected from the group consisting of polyamide resin, polyethylene resin, polypropylene resin, polyester resin, polyphenylene sulfide resin and polyether ether ketone resin.

20. Method of claim 17 wherein the thermoplastic resin contains fibrous reinforcing material.

21. Method of claim 17 wherein the thermoplastic resin contains an inorganic filler.

22. Method of claim 17 wherein the product is in the form of an eyeglass frame.

* * * * *